US006840556B1

(12) United States Patent
Catlett

(10) Patent No.: US 6,840,556 B1
(45) Date of Patent: Jan. 11, 2005

(54) DEVICE FOR LIFTING GAS CYLINDERS

(76) Inventor: Larry K. Catlett, 1285 Winding Dr., Sevierville, TN (US) 37876

( * ) Notice: Subject to any disclaimer, the term of this patent is extended or adjusted under 35 U.S.C. 154(b) by 72 days.

(21) Appl. No.: 10/255,389

(22) Filed: Sep. 26, 2002

(51) Int. Cl.$^7$ ................................................ B65G 7/12
(52) U.S. Cl. ........................................ 294/16; 294/31.2
(58) Field of Search ............................ 294/15, 16, 28, 294/31.2, 113, 119.2, 164, 165

(56) References Cited

U.S. PATENT DOCUMENTS

| 151,061 A | | 5/1874 | Stuart | |
|---|---|---|---|---|
| 188,027 A | * | 3/1877 | Oak | 294/16 |
| 215,344 A | | 5/1879 | Flynn | |
| 664,623 A | * | 12/1900 | Buckland | 294/16 |
| 844,239 A | | 2/1907 | Bogel | |
| 874,681 A | * | 12/1907 | Hungate | 294/28 |
| 1,091,008 A | | 3/1914 | Nagle | |
| 1,491,171 A | | 4/1924 | Salvail | |
| 1,643,407 A | | 9/1927 | Florance | |
| 1,779,060 A | | 10/1930 | Choate | |
| 1,885,788 A | | 11/1932 | Westburg | |
| 1,987,493 A | | 1/1935 | Richards | |
| 2,645,376 A | * | 7/1953 | Gunther | 220/23.89 |
| 2,749,173 A | * | 6/1956 | Peterson | 294/113 |
| 3,960,398 A | * | 6/1976 | Johnson | 294/16 |
| 4,000,922 A | * | 1/1977 | Wade | 294/16 |
| 4,026,435 A | | 5/1977 | Hendon | |
| 4,236,743 A | * | 12/1980 | Fox | 294/27.1 |
| 4,457,445 A | | 7/1984 | Hanks et al. | |
| 4,463,978 A | | 8/1984 | Mountain et al. | |
| 4,694,972 A | | 9/1987 | Bimonte et al. | |
| 4,795,202 A | | 1/1989 | Mader | |
| 4,901,959 A | | 2/1990 | Stage | |
| 5,549,339 A | | 8/1996 | Frean | |
| 5,556,146 A | | 9/1996 | Kirk | |
| 5,558,246 A | | 9/1996 | Ross, Jr. | |

* cited by examiner

Primary Examiner—Dean J. Kramer
(74) Attorney, Agent, or Firm—Luedeka, Neely & Graham PC

(57) ABSTRACT

A device for maneuvering cylinders having first and second semi-circular lifting members hingedly connected to one another by first and second hinge members. The lifting members are urged toward one another and the cylinder to frictionally secure the lifting members against the cylinder for maneuvering of the cylinder. First and second free ends of the first lifting member are maintained in a spaced apart relationship relative to first and second free ends of the second lifting member corresponding to a desired gap distance, and the first and second hinge members of each lifting member each define a hinge point located a desired hinge distance vertically spaced from free edges of each of the lifting members, such that the ratio of the gap distance to the hinge distance is at least about 1.25.

1 Claim, 4 Drawing Sheets

US 6,840,556 B1

DEVICE FOR LIFTING GAS CYLINDERS

FIELD OF THE INVENTION

This invention relates generally to devices for grasping cylinders. More particularly, this invention relates to devices for lifting cylinders containing pressurized gas.

BACKGROUND AND SUMMARY OF THE INVENTION

Industrial gas cylinders are heavy and cumbersome, which makes them difficult to lift, move, or otherwise maneuver. A need exists in the art for a device that facilitates maneuvering of industrial gas cylinders.

The present invention relates to a device for maneuvering cylinders such as industrial gas cylinders.

In a preferred embodiment, the device includes first and second lifting members hingedly connected to one another. Each lifting member includes a body substantially configured in a semi-circle having opposite first and second free ends with a curved interior surface and an opposite exterior surface extending between the free ends and defining first and second free edges.

A handle is attached to the exterior surface of each body, and each body includes a first hinge member located adjacent the first free end of the body and extending below the first free edge of the body.

Each body also includes a second hinge member located adjacent the second free end of the body and extending past the first free edge of the body so as to be in a facing relationship with the first hinge member.

The first and second bodies are hingedly connected to one another by hingedly connecting the first hinge member of the first body with the second hinge member of the second body, and by hingedly connecting the second hinge member of the first body with the first hinge member of the second body.

The lifting device may be placed over a cylinder and positioned at a desired location and the handles may then be urged toward one another and the cylinder to bear the first and second bodies toward the cylinder to frictionally secure the device in the desired position for maneuvering of the cylinder.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
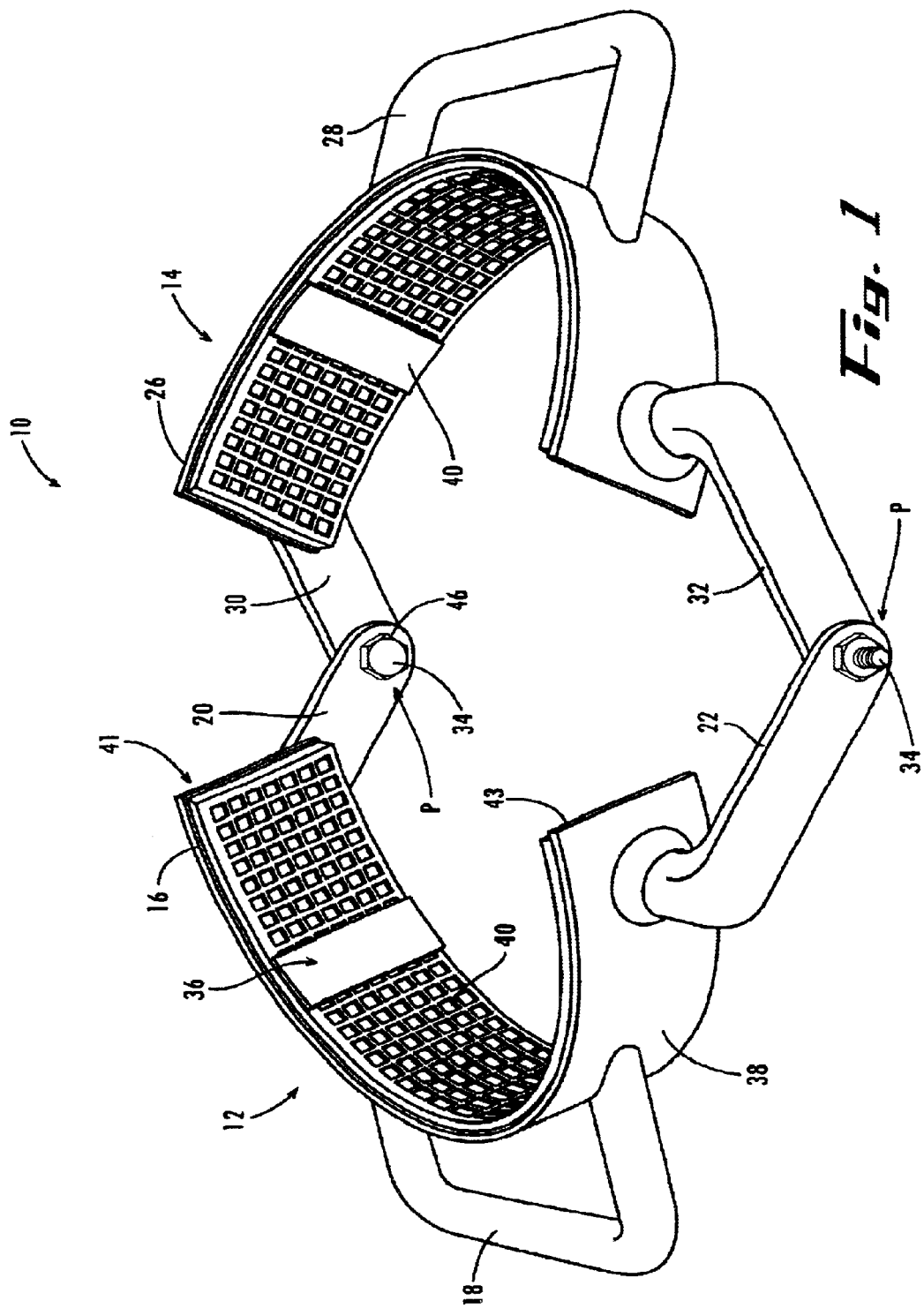
FIG. 1 is a top perspective view of a lifting device in accordance with a preferred embodiment of the invention.
Figure 2:
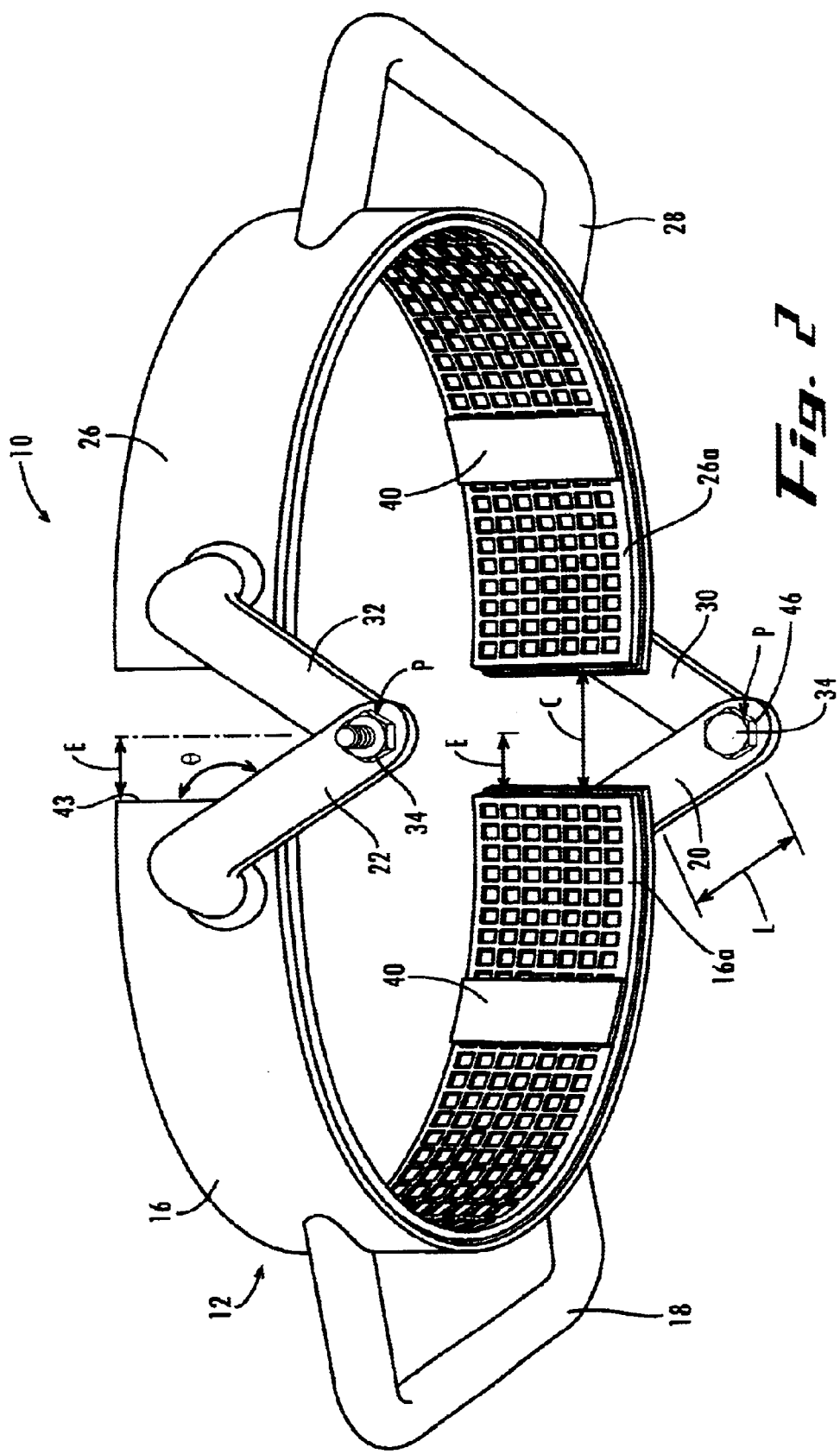
FIG. 2 is a bottom perspective view of the device of FIG. 1 in a closed orientation.
Figure 3:
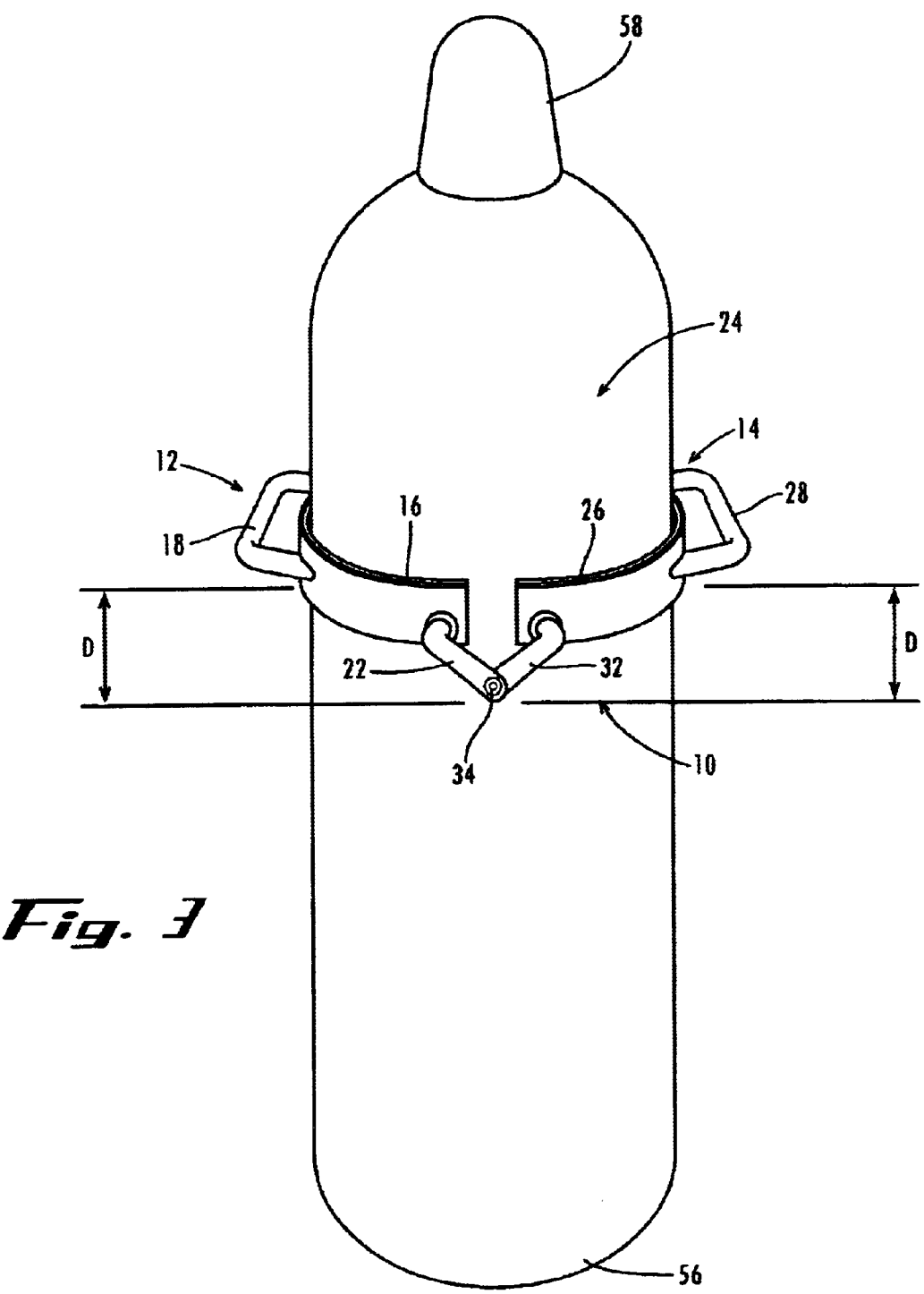
FIG. 3 shows the device of FIG. 1 installed on a cylinder.

With initial reference to FIGS. 1–2, the invention relates to a lifting device 10 having a opposing of lifting members 12 and 14 hingedly connected to one another. The member 12 preferably includes a body 16, a handle 18, and a pair of hinge members 20 and 22. The device 10 is configured for use with objects having a substantially circular cross-section, such as industrial gas cylinder 24 (FIG. 3). The dimensions provided herein are for the purpose of example only and provide desired dimensions for construction of a device 10 for use with gas cylinders having a diameter ranging from about 6½ to about 7¾ inches.

The member 14 is preferably of identical construction to the member 12 and includes a body 26, handle 28, and a pair of hinge members 30 and 32. Fasteners 34, such as nuts and bolts, are preferably used to connect the hinge members 20 and 22 to the hinge members 30 and 32.

The body 16 is preferably made of steel plate material having a thickness of from about $1/16$ to about $3/16$ inch, most preferably about ⅛ inch. The body 16 has a semi-circular configuration, with a curved interior surface 36 and an opposite exterior surface 38. A friction enhancing material, such as elastomeric strip 40 is preferably adhered, as by adhesive, to the interior surface 36. The elastomeric strips are preferably of a relatively soft rubber material and have a rough or textured outwardly facing surface to facilitate gripping of the cylinder 24.

Figure 4:
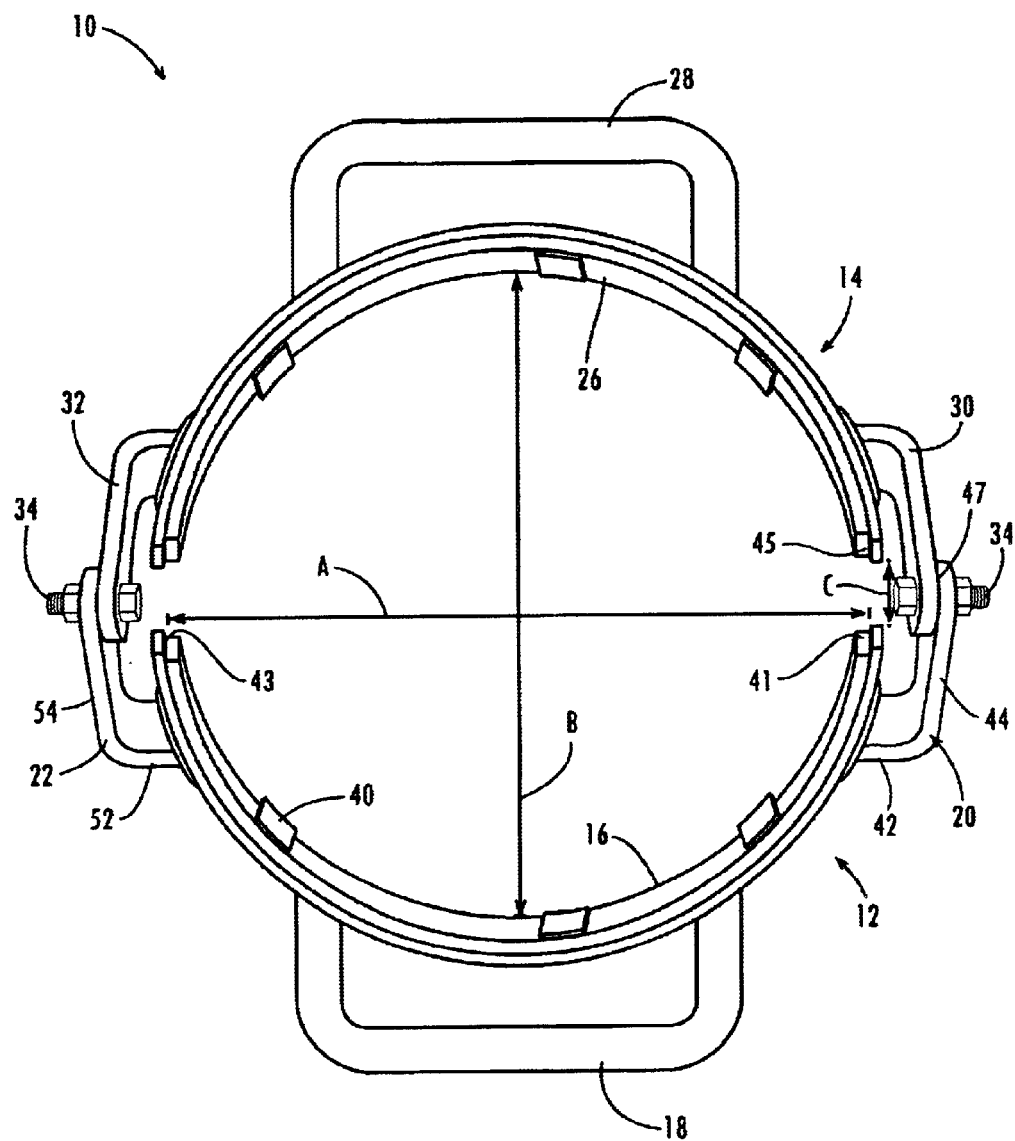
FIG. 4 is a bottom plan view of the device of FIG. 1.

With reference to FIG. 4, the distance A between first and second free ends 41 and 43 preferably ranges from about 7 to about 7½ inches, most preferably about 7¼ inches, and the distance B between the curved interior surfaces of the body 16 and 26 of the assembled device preferably has a distance in the same range. This leaves a gap C between the free end 41 of the body 16 and a corresponding free end 45 of the body 26 of from about ¾ to about 1¼ inches, most preferably about 1 inch.

The handles 18 and 28 are each preferably provided by a generally U-shaped piece of steel rod and attached as by welding to the bodies 16 and 26. For example. The handle 18 is preferably attached by welding to the exterior surface 38 of the body 16 and is preferably substantially centrally located between the hinge members 20 and 22.

The hinge member 20 is preferably provided as by a generally L-shaped portion of steel plate having a minor leg 42 and a major leg 44 substantially normal to the minor leg 42. An end of the minor leg 42 is preferably attached to the exterior surface 38 of the body 16 as by welding. An aperture 46 is preferably located adjacent a free end 47 of the major leg 44 for receiving the fastener 34.

The plate material used for the hinge member 20 preferably has a thickness of from about $3/16$ to about $5/16$ inch, a width of about ¾ inch, and an overall length of about 4 inches, with the minor leg 42 representing about ¾ inch of the total 4 inch length of the hinge member. That is, as seen in FIG. 2, the major leg 44 has a length L of about 3¼ inches.

The hinge members are preferably welded adjacent lower edges 16a and 26a of the bodies 16 and 26 so that hinge points P are located a distance D of between about 1½ and 2 inches past the lower edges 16a and 26a (FIG. 3). It has been discovered that the ratio of the distance D to the gap C is preferably from about 1.25 or greater, most preferably between about 1.5 and 2.

The hinge members also preferably extend away from the body at an angle α relative to the free edge 43 of from about 55 to about 65 degrees, most preferably about 60 degrees, such that the hinge points P extend past the free ends by a distance E corresponding to about one-half of the gap distance C.

The hinge member 22 likewise includes a minor leg 52 and a major leg 54, with the hinge member 22 being substantially identical to the hinge member 20, except that the minor leg 52 has a length of about 1 inch when the total length of the hinge member 22 is about 4 inches.

The hinge member 32 is preferably of the same configuration and dimension as the hinge member 20 and the hinge member 30 is preferably of the same configuration and dimension as the hinge member 22. Likewise, each of the major legs of the hinge members includes an aperture corresponding to the aperture 46 for installation of the fasteners 34.

It will be understood that the device 10 may be of virtually any dimension depending upon the object with which it is to be used. However, in the context of a preferred embodiment, the device 10 is designed for lifting industrial gas cylinders having weights of from about 30 pounds to about 180 pounds and is preferably made of welded steel construction. These cylinders typically have a length of from about 2 to about 5 feet and a diameter of from about 3 to about 12 inches.

Accordingly, it will be understood that the dimensions provided herein are for the purpose of example only and are provided to describe preferred dimensions for use with a conventional industrial gas cylinder having an external diameter of about 7¼ inches. However, a device 10 of the described dimensions will generally be suitable for use with cylinders having diameters ranging from about 6½ to about 7¾ inches.

The device 10 is installed on the cylinder 24 by first positioning the device with the members 12 and 14 pivoted away from one another as seen in FIG. 1, with the hinge members positioned toward a bottom 56 of the cylinder 24 and, in this setting, below the bodies 16 and 26. The device is then placed over the cylinder 24 and positioned at a desired location along the length of the cylinder. The handles 18 and 28 may then be urged toward 58 top of the cylinder to bear the curved interior surfaces of body 16 and the body 26 against the exterior of the cylinder 24 as shown in FIG. 3. Maintaining the bodies 16 and 26 in this orientation as by maintaining an upward pressure on the handles 18 and 28 frictionally secures the device 10 in the desired position and the cylinder 24 may be lifted or otherwise moved using the device 10.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A device for maneuvering cylinders, the device comprising first and second lifting members hingedly connected to one another, each lifting member including:

a body substantially configured in a semicircle having opposite first and second free ends with a curved interior surface and an opposite exterior surface extending between the free ends and defining first and second free edges, a handle attached to a substantial mid-portion of the exterior surface of the body and oriented substantially perpendicular to the exterior surface, a first L-shaped hinge member located adjacent the first free end having a minor leg portion extending horizontally away from the exterior surface and a major leg portion extending vertically from the minor leg portion and horizontally past the first free edge of the body, and a second L-shaped hinge member located adjacent the second free end and having a minor leg portion extending horizontally away from the exterior surface and a major leg portion extending vertically from the minor leg portion and horizontally past the second free edge of the body so as to be in a facing relationship with the first hinge member, wherein each hinge member extends vertically away from its respective body at an angle of from about 55 to about 65 degrees;

wherein the first and second lifting members are hingedly connected to one another by hingedly connecting the first hinge member of the first lifting member with the second hinge member of the second lifting member, and by hingedly connecting the second hinge member of the first lifting member with the first hinge member of the second lifting member, such that the lifting device may be placed over a cylinder and positioned at a desired location and the handles may then be urged toward one another and an outer wall of the cylinder to bear the first and second lifting members toward the cylinder to frictionally secure the device in the desired position for maneuvering of the cylinder, and wherein the first and second free ends of the body of the first lifting member are maintained in a spaced apart relationship relative to the first and second free ends of the body of the second lifting member corresponding to a desired gap distance, and the first and second hinge members of each lifting member each define a hinge point located a desired hinge distance vertically spaced from the first free edges of each of the lifting members, such that the ratio of the gap distance to the hinge distance is at least about 1.25.

* * * * *